United States Patent
AlYousef et al.

(10) Patent No.: US 12,467,347 B2
(45) Date of Patent: Nov. 11, 2025

(54) ENHANCED OIL RECOVERY USING CARBONATED WATER AND TWO SALT SOLUTIONS

(71) Applicant: SAUDI ARABIAN OIL COMPANY, Dhahran (SA)

(72) Inventors: Zuhair AlYousef, Saihat (SA); Hamoud A. Alqahtani, Dammam (SA); Subhash C. Ayirala, Dhahran (SA); Muhammad M. Almajid, Qatif (SA); Ali Abdullah Al-Taq, Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/429,047

(22) Filed: Jan. 31, 2024

(65) Prior Publication Data

US 2025/0243736 A1    Jul. 31, 2025

(51) Int. Cl.
    E21B 43/16    (2006.01)
(52) U.S. Cl.
    CPC ............................. E21B 43/164 (2013.01)
(58) Field of Classification Search
    None
    See application file for complete search history.

(56) References Cited

U.S. PATENT DOCUMENTS

| | | | |
|---|---|---|---|
| 4,330,037 A * | 5/1982 | Richardson | C09K 8/60 166/250.01 |
| 9,738,824 B2 | 8/2017 | Al-Nakhli et al. | |
| 10,648,305 B2 | 5/2020 | Ayirala et al. | |
| 11,299,663 B2 | 4/2022 | Al-Taq et al. | |
| 12,110,772 B1 * | 10/2024 | Alyousef | E21B 43/20 |

(Continued)

FOREIGN PATENT DOCUMENTS

| CN | 101323780 B | 6/2010 |
|---|---|---|
| CN | 107130950 A | 9/2017 |

OTHER PUBLICATIONS

Peksa, Anna E. et al., "Molecular Diffusion of CO2 From Carbonated Water (CW) Into the Oil—Experimental Observations"; Proceedings of the SPE Asia Pacific Oil and Gas Conference and Exhibition; Paper No. SPE-165902-MS; pp. 1-12; Oct. 22, 2013 (12 pages).

(Continued)

*Primary Examiner* — Andrew Sue-Ako
(74) *Attorney, Agent, or Firm* — Osha Bergman Watanabe & Burton LLP (57) ABSTRACT

A method of enhancing recovery of hydrocarbons from a formation includes providing a carbonated fluid, reacting a first salt solution with a second salt solution to provide heat, displacing carbon dioxide from the carbonated fluid, sweeping the formation with the displaced carbon dioxide, mixing the displaced carbon dioxide with at least a portion of the hydrocarbons in the vertical regions, thereby producing a mixture, and producing the mixture via a production well in the formation, thereby enhancing recovery of the hydrocarbons from the formation. A system for controlling the release of carbon dioxide from carbonated water and enhancing oil recovery from a hydrocarbon bearing formation includes an injection system in fluid communication with an injection well that is in fluid communication with a production well via a hydraulic connection.

14 Claims, 3 Drawing Sheets

(56) References Cited

U.S. PATENT DOCUMENTS

2021/0062630 A1* 3/2021 AlYousif ................ C09K 8/584
2021/0284899 A1* 9/2021 Al-Nakhli ................ C09K 8/74
2022/0298901 A1* 9/2022 AlSaud ............... E21B 49/0875

OTHER PUBLICATIONS

Zou, Jiandong et al., "An Experimental Study of the Dynamic Mass Transfer Process During Carbonated Water Injection"; Proceedings of the International Petroleum Technology Conference; Paper No. IPTC-19048-MS; pp. 1-12; Mar. 22, 2019 (12 pages).

* cited by examiner

ENHANCED OIL RECOVERY USING CARBONATED WATER AND TWO SALT SOLUTIONS

BACKGROUND

During primary oil recovery, oil inside an underground hydrocarbon reservoir is driven to the surface (for example, toward the surface of an oil well) by a pressure difference between the reservoir and the surface. However, only a fraction of the oil in an underground hydrocarbon reservoir can be extracted using primary oil recovery. The use of enhanced oil recovery (EOR) processes has greatly benefited the oil and gas industry by increasing the production of problematic and underperforming hydrocarbon bearing wells and fields. Thus, a variety of techniques for enhanced oil recovery are utilized after primary oil recovery to increase the production of hydrocarbons from hydrocarbon-bearing formations.

Enhanced oil recovery (EOR) refers to the augmentation of natural energy through the injection of fluids to displace oil toward producing wells. Some examples of these techniques include gas flooding, chemical flooding, steam flooding, and low salinity water flooding to provide favorable conditions for hydrocarbon recovery, such as oil swelling, oil viscosity reduction, and wettability alteration. In particular, carbon dioxide injection is an attractive strategy for improving oil recovery.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of enhancing recovery of hydrocarbons from a formation that includes providing a carbonated fluid, reacting a first salt solution with a second salt solution to provide heat, displacing carbon dioxide from the carbonated fluid, sweeping the formation with the displaced carbon dioxide, mixing the displaced carbon dioxide with at least a portion of the hydrocarbons in the vertical regions, thereby producing a mixture, and producing the mixture via a production well in the formation, thereby enhancing recovery of the hydrocarbons from the formation.

In another aspect, embodiments disclosed herein relate to a system for controlling the release of carbon dioxide from carbonated water and enhancing oil recovery from a hydrocarbon bearing formation. The system includes an injection system in fluid communication with an injection well that is in fluid communication with a production well via a hydraulic connection, and where the injection well and the production well are disposed in the same geologic formation or in different geologic formations. The injection system includes a carbonated fluid, a first salt solution, a second salt solution that is capable of reaction with the first salt solution upon contact under injection conditions and under conditions in the formation.

Other aspects and advantages of the claimed subject matter will be apparent from the following description and the appended claims.

DETAILED DESCRIPTION

A subterranean formation is the fundamental unit of lithostratigraphy. As used in the present disclosure, the term "subterranean formation" may refer to a body of rock that is sufficiently distinctive and continuous from the surrounding rock bodies that the body of rock can be mapped as a distinct entity. A subterranean formation may be sufficiently homogenous to form a single identifiable unit containing similar geological properties throughout the subterranean formation, including, but not limited to, porosity and permeability. A single subterranean formation may include different regions, where some regions include hydrocarbons and others do not. The subterranean formation may be any hydrocarbon bearing reservoir, such as an oil bearing reservoir To produce hydrocarbons from the hydrocarbon regions of the subterranean formation, production wells are drilled to a depth that enables these hydrocarbons to travel from the subterranean formation to the surface. This initial stage of production is referred to as "primary recovery."

In primary recovery, natural formation energy, such as gasdrive, waterdrive, or gravity drainage, displaces hydrocarbons from the subterranean formation into the wellbore and up to the surface. The term "wellbore" may refer to the drilled hole or borehole, including the openhole or uncased portion of the well. Initially, the formation pressure may be considerably greater than the downhole pressure inside the wellbore. This differential pressure may drive hydrocarbons toward the wellbore and up to the surface. However, as the formation pressure decreases due to hydrocarbon production, the differential pressure also decreases. The primary recovery stage reaches its limit when the formation pressure is reduced to the point that the hydrocarbon production rates are no longer economical or when the proportions of gas or water in the production stream increase to the point that further primary recovery is no longer economical. During primary recovery, only a minority percentage of the total initial hydrocarbons in the subterranean formation are extracted (typically around 10% by volume for hydrocarbon-containing subterranean formations).

During a second recovery stage of hydrocarbon production, treatment materials such as water or gas may be injected into the subterranean formation through injection wells positioned in rock that is in fluid communication with production wells. As used in the present disclosure, the term "injection well" may refer to a well in which fluids are injected into the subterranean formation rather than produced from the subterranean formation. Secondary recovery may operate to maintain formation pressure and to displace hydrocarbons toward the wellbore. The secondary recovery stage reaches its limit when the treatment materials, such as water or gas, are produced from the production well in amounts sufficient such that the production of hydrocarbons is no longer economical. However, these treatment materials may flow into other regions of the formation that may not be hydrocarbon-producing regions. This may result in loss of treatment materials. The loss of treatment materials may further result in an increase in the quantity of the treatment materials required to conduct the secondary recovery treatments.

Carbon dioxide ($CO_2$) is widely used in flooding processes for enhanced oil recovery. Advantages associated with injecting $CO_2$ into underground formations may include: 1) improving oil production from selected reservoirs, and 2) reducing greenhouse gas emissions through carbon dioxide sequestration. While it can be effective for oil recovery due to its affinity for and miscibility with hydrocarbons, along with its ability to be readily used in a supercritical state in hydrocarbon-bearing formations, $CO_2$ flooding suffers from a number of challenges in its use. The density of $CO_2$ is less than many of the fluids present in subterranean formations, including water and the liquid and semi-solid hydrocarbons. Due to this reduced density, $CO_2$ has a tendency to seek non-uniform upward-directed flow paths in the reservoir as it progresses away from the injection point and through the reservoir. This may lead to the introduced $CO_2$ preferentially bypassing portions of the reservoir and leaving portions of the reservoir untreated. This phenomenon is called "gravity override," which can limit the amount of hydrocarbons produced.

The treatment methods and systems of one or more embodiments may include a controlling release of $CO_2$ from the carbonated fluid in a hydrocarbon bearing formation via a thermogenic reaction between a first salt solution and a second salt solution. In one or more embodiments, methods, systems, and compositions of the present disclosure provide more efficient carbon capture utilization and storage for which $CO_2$ is used with high efficiency to recover hydrocarbons when compared to traditional $CO_2$ flooding methods for hydrocarbon recovery.

Formation Treatment System

In one aspect, one or more embodiments presented herein relate to a formation treatment system. In one or more embodiments, the carbonated fluid includes a source of $CO_2$ dissolved in a first aqueous fluid. The source of $CO_2$ may be $CO_2$ that has been captured and compressed. In one or more embodiments, the carbonated fluid has a density greater than a formation fluid.

In one or more embodiments, the first aqueous fluid is a water-based fluid. The water-based fluid may be distilled water, brine, deionized water, tap water, fresh water from surface or subsurface sources, formation water produced from the structural low, formation water produced from a different geologic formation, production water, frac or flowback water, natural and synthetic brines, residual brine from desalination processing, a regional water source, such as fresh water, brackish water, natural and synthetic sea water, potable water, non-potable water, ground water, seawater, other waters, and combinations thereof, that are suitable for use in a wellbore environment. In one or more embodiments, the water used may naturally contain contaminants, such as salts, ions, minerals, organics, and combinations thereof, as long as the contaminants do not interfere with the release of $CO_2$ from the carbonated fluid, a thermogenic reaction, or both. In one or more embodiments, the water-based fluid includes additives such as viscosifiers, polymers, surfactants, and combinations thereof.

The water-based fluids of one or more embodiments may include other additives provided the additives do not interfere with the release of $CO_2$ from the carbonated water, a thermogenic reaction, or both. Such additives may include, for instance, one or more wetting agents, corrosion inhibitors, biocides, surfactants, dispersants, interfacial tension reducers, mutual solvents, and thinning agents. The identities and use of the aforementioned additives are not particularly limited. One of ordinary skill in the art will, with the benefit of this disclosure, appreciate that the inclusion of a particular additive will depend upon the stage of reservoir operations, desired application, and properties of a given wellbore fluid.

In one or more embodiments, the system may include $CO_2$ dissolved in a sufficient amount of a first aqueous fluid such that the gas is completely dissolved and maintains the form of a carbonated fluid at the depth of the release into the target formation. The $CO_2$ may be dissolved in a sufficient amount to maximize a formation sweep efficiency via maximization of $CO_2$ release from the carbonated fluid. In one or more embodiments, the amount of $CO_2$ dissolved in the first aqueous fluid may be dependent upon a temperature and/or pressure of the formation.

In one or more embodiments, the solubility of $CO_2$ is salinity dependent. As salinity of the first aqueous fluid decreases, the solubility of $CO_2$ in the first aqueous fluid increases. Generally, $CO_2$ solubility in brine decreases as salinity increases due to the so-called "salting out" effect. Comparisons between different salinities indicate that $CO_2$ solubility decreases nearly 49% when the salinity increases from about 0 M (Molar) to about 4 M aqueous NaCl solutions. In one or more embodiments, more $CO_2$ is dissolved in a water-based fluid as described above with a lower salinity than a water-based fluid with high salinity. A lower amount of a water-based fluid may be needed when water of low salinity is used for the same amount of $CO_2$ available under the same temperature and pressure conditions when compared to a high salinity water. In addition, when more $CO_2$ is dissolved in water, the pH of the water decreases.

In one or more embodiments, the uniform release of $CO_2$ in a formation includes capturing $CO_2$ via solvation in an aqueous fluid. The solubilization of $CO_2$ in the aqueous fluid may be represented by Equation (1), below.

$$CO_2(g) + H_2O(aq) \rightleftharpoons H_2CO_3(aq) \quad (1)$$

As provided above, $CO_2$ gas may react with water ($H_2O$) to dissolve and provide aqueous carbonic acid ($H_2CO_3$). Once dissolved in water in the form of carbonic acid, $CO_2$ may no longer be buoyant, providing a dense and acidic carbonated fluid. An acidity of the carbonated fluid may be represented by the reversible dissociation of carbonic acid in Equation (3), below.

$$H_2CO_3(aq) \rightleftharpoons HCO_3^-(aq) + H^+(aq) \quad (2)$$

As such, free hydrogen of dissolved $CO_2$ may provide an acidic Carbonated fluid with a pH of about 7.0 or less, about 6.0 or less, about 4.0 or less, about 3.0 or less, or about 2.0 or less. As a result, it is expected that when more $CO_2$ is dissolved in a lower salinity water based fluid to produce a carbonated fluid with a pH of about 7.0 or less, reactivity of a thermogenic mixture may be enhanced. In one or more embodiments, the formation treatment system includes an acidic carbonated fluid in contact with a first salt solution, the second salt solution, or combinations thereof downhole in the formation.

The first salt solution may include a first thermogenic agent dissolved in a second aqueous fluid. The first thermogenic agent may include an ammonium-based compound. The ammonium-based compound may be an ammonium salt. For example, in some embodiments the ammonium containing compound may be ammonium chloride ($NH_4Cl$), ammonium bromide ($NH_4Br$), ammonium nitrate ($NH_4NO_3$), ammonium nitrite ($NH_4NO_2$), ammonium sulfate (($NH_4)_2SO_4$), ammonium carbonate (($NH_4)_2CO_3$), ammonium hydroxide (($NH_4)OH$)), or combinations of these. In one or more embodiments, the second aqueous fluid may be a water-based solution as described above.

In one or more embodiments, the first salt solution may include an acid. A variety of acids may be used. In one or more embodiments, the acid is selected from the group consisting of hydrochloric acid (HCl), hydrofluoric acid (HF), acetic acid ($CH_3COOH$), formic acid (HCOOH), carbonic acid ($H_2CO_3$), and combinations thereof.

The second salt solution may include a second thermogenic agent dissolved in a third aqueous fluid. In one or more embodiments, the third aqueous fluid is a water-based fluid as described above. In one or more embodiments, the second thermogenic agent is a nitrite-based compound. The nitrite-based compound may be a nitrite salt. For example, in some embodiments the nitrite-based compound may be selected from the group consisting of sodium nitrite ($NaNO_2$), potassium nitrite ($KNO_2$), sodium hypochlorite, and combinations thereof. In some embodiments, the second salt solution composition is substantially free of acid. As used in the present disclosure, "substantially free" means that the second solution includes less than 5% by volume, less than 4% by volume, less than 3% by volume, less than 2% by volume, less than 1% by volume, or less than 0.1% by volume of an acid. Acid present in the second salt solution may result in undesirable nitric oxide and side product generation when the acid is mixed with the nitrite-based compound.

In one or more embodiments, the ammonium-based compound and the nitrite-based compound may independently range concentration of the first salt solution and the second salt solution, respectively. The independent concentrations may be in a range with a lower limit of one of about 1 M (Molar), about 1.5 M, about 2.0 M, about 2.5 M, about 3.0 M, about 3.5 M, about 4.0 M, and about 5.0 M with an upper limit of one of about 2.0 M, about 3.0 M, about 4.0 M, about 5.0 M, and about 6 M, where a value of the lower limit may be paired with a mathematically compatible value of the upper limit.

In one or more embodiments, the molar ratio of the nitrite-based compound of the second salt solution composition to the ammonium-based compound introduced to the subterranean formation may be from 1:1 to 3:1. For example, in some embodiments the molar ratio of $NaNO_2$ to $NH_4Cl$ introduced to the subterranean formation may be from 1:1 to 3:1; from 1.5:1 to 3:1; from 2:1 to 3:1; from 2.5:1 to 3:1; from 1:1 to 2.5:1; from 1:1 to 2:1; from 1:1 to 1.5:1; from 1.5:1 to 2.5:1; from 1.5:1 to 2:1; or from 2:1 to 2.5:1.

In one or more embodiments, a greater molar ratio of $NaNO_2$ relative to $NH_4Cl$ allows for an increased thermogenic reaction rate. For example, a $NaNO_2$ to $NH_4Cl$ molar ratio of at least 2:1 may allow for an increased reaction rate of the first salt solution composition and the second salt solution composition compared to a $NaNO_2$ to $NH_4Cl$ molar ratio of less than 2:1. In one or more embodiments, a trigger may be present to initiate a thermogenic reaction for a first salt solution and second salt solution with a molar ratio of $NaNO_2$ to $NH_4Cl$ molar ratio of less than 2:1. The trigger may include a fluid, such as a carbonated fluid, with a pH of 4.0 or less, heat with a temperature of 60° C. or more, or combinations thereof.

In one or more embodiments, the concentration and/or molar ratio of the nitrite-based compound of the second salt solution composition to the ammonium-based compound depends on a desired amount of heat to generate from a reaction between the ammonium-based compound and the nitrite-based compound. For example, a desired amount of heat released may relate to an increase in temperature from about 70° F. to about 600° F. In one or more embodiments, the increase in temperature is in a range with a lower limit of one of about 70° F., about 80° F., about 90° F., about 100° F., about 150° F., about 200° F., about 250° F., about 300° F., about 350° F., about 400° F., and about 450° F. and an upper limit of one of about 150° F., about 200° F., about 250° F., about 300° F., about 350° F., 400° F., about 450° F., about 500° F., and about 600° F., where a value of the lower limit may be paired with a value of a mathematically compatible upper limit.

The concentration of the nitrite-based compound in the second salt solution and ammonium-based compound in the first salt solution may be selected based on the reaction kinetics of the system, the solubility of the compounds based on a formation temperature, a formation pressure, a target amount of $CO_2$ to be sequestered from the carbonated fluid, or combinations thereof. For example, when the molar ratio of $NaNO_2$ to $NH_4Cl$ is at least 1:1 the reaction may occur spontaneously at a more acidic pH, such as equal to or less than about 4.0, or at a temperature equal to or greater than about 60° C.

In one or more embodiments, the formation treatment system includes an injection system. In one or more embodiments, the injection system is in fluid communication with an injection well, wherein the injection well is in fluid communication with a production well via a hydraulic connection, wherein the injection well and the production well are disposed in the same geologic formation or in different geologic formations.

In one or more embodiments, the injection system is configured to deliver the first salt solution and the second salt solution to the formation via serial injection of a first salt solution and a second salt solution via an injection well. In one or more embodiments, the injection system is configured to deliver the carbonated fluid to the formation via the injection well. The injection system may be configured to separately inject the first salt solution and the second salt solution, where the second salt solution is capable of reaction with the first salt solution upon contact, under injection conditions, under conditions in the formation, or combinations thereof.

The first salt solution, the second salt solution, and the carbonated fluid may be independently injected into the formation via the injection well in the form of a pill. As one of ordinary skill may appreciate, the term "pill" may refer to a quantity of less than 200 bbl, where 1 bbl is 42 gallons per cubic meter, of a task-specific fluid different from a traditional drilling fluid. In one or more embodiments, the injection system is configured to inject the carbonated fluid, the first salt solution, and the second salt solution are injected sequentially into the formation in the form of a pill. In one or more embodiments, the injection system is configured to deliver a first salt solution and a second salt solution to the formation separately via one or more fluid transport lines. The one or more fluid transport lines may be independently disposed in the wellbore annulus. The one or more fluid transport lines may transport one or more fluids from a surface location of the formation to a downhole location of the formation.

The injection system may be configured to deliver a first salt solution and a second salt solution simultaneously to the formation via separate fluid transport lines. For example, the injection system may be configured to deliver a first salt solution to the formation via a first fluid transport line. The injection system may deliver a second salt solution composition to the formation via a second fluid transport line.

The injection system may be configured to deliver a carbonated fluid separately to the formation via a third fluid transport line. In one or more embodiments, the injection system may be configured to deliver the carbonated fluid composition with a first salt solution to the formation via the first fluid transport line.

Supporting equipment for embodiments of the formation treatment system, injection system, or both may include additional standard components or equipment that enables and makes operable the described apparatuses, processes, methods, systems, and compositions of matter. Examples of such standard equipment known to one of ordinary skill in the art includes, but are not limited to, heat exchanges, blowers, single and multi-stage compressors and pumps, separation equipment, manual and automated control and isolation valves, switches, analogue and computer-based controllers, and pressure-, temperature-, level-flow-, and other-sensing devices.

Enhancing Hydrocarbon Recovery

Figure 1:
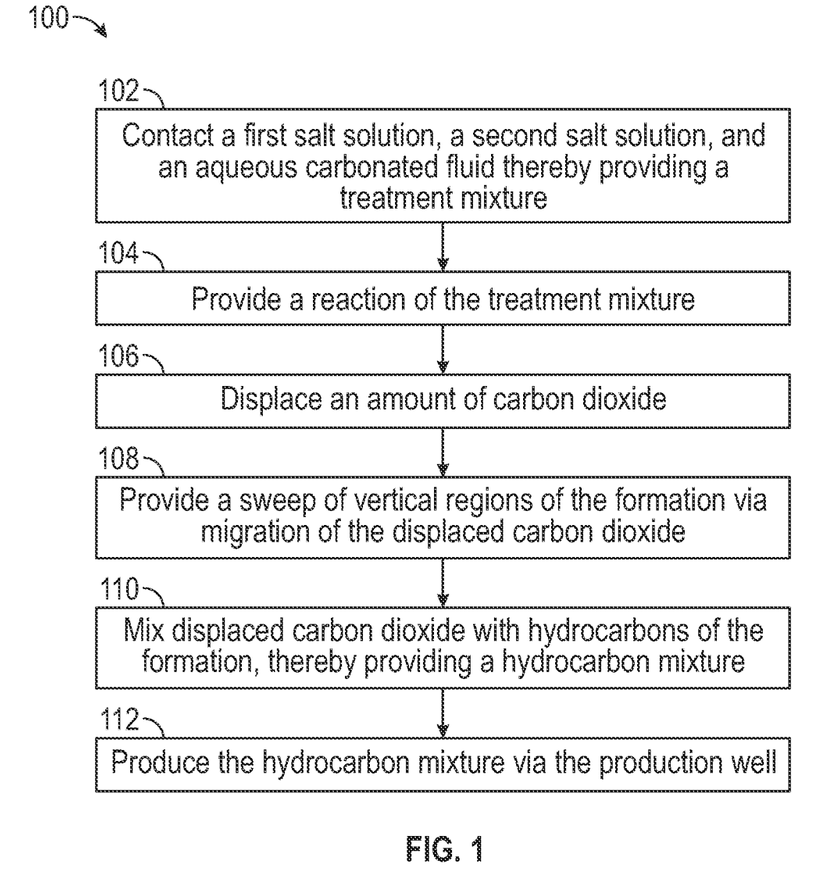
FIG. 1 is a block flow diagram of a method of enhancing hydrocarbon recovery from a formation in accordance with one or more embodiments.

In another aspect, embodiments of the present disclosure are directed to methods for enhancing oil recovery of hydrocarbons from a subterranean formation. FIG. 1 is a block flow diagram for a method of enhancing recovery of hydrocarbons from a formation according to one or more embodiments. In one or more embodiments, the method 100 is implemented after carbonated fluid injection produces mostly water with little to no hydrocarbons from a subterranean formation. The method includes block 102 in which a carbonated fluid is provided. Providing the carbonated fluid may include injecting the carbonated fluid into a formation. The carbonated fluid may be as described above. As one of ordinary skill may appreciate, the carbonated fluid may be prepared at a surface location of the formation or at an off-site location.

In block 104, a thermogenic reaction of a treatment fluid comprising a first salt solution and a second salt solution is provided. Providing the thermogenic reaction may further include providing a first salt solution and a second salt solution in the formation. The first salt solution and the second salt solution may be injected separately into the formation. In some embodiments, the carbonated fluid is injected prior to the injection of a first salt solution and a second salt solution. The first salt solution and the second salt solution may be injected simultaneously. In one or more embodiments, the first salt solution and the second salt solution may be injected separately via a first salt solution transport line and a second salt solution transport line as described above.

In one or more embodiments, the first salt solution, the second salt solution, and the carbonated fluid are simultaneously introduced to the basaltic formation via separate fluid transport lines as described above such that the solutions are mixed in the formation. The carbonated fluid may be injected before the injection of the first and second salt solutions.

The second salt solution may be reactive with the first salt solution under the conditions in the formation after the injecting. In one or more embodiments, the thermogenic reaction is a reaction that occurs between a first salt solution and a second salt solution. A non-limiting example of the thermogenic reaction is shown in Equation (3) using $NH_4Cl$ as the ammonium-based compound and $NaNO_2$ as the nitrite-based compound, which react to generate heat and nitrogen gas. However, it should be understood by a person of ordinary skill in the art that compounds of similar class of reactants may generally react in a similar way as the example reaction schemes shown in Equation (3).

$$NH_4Cl + NaNO_2 + 2H_2O \rightarrow N_2(g) + NaCl + H_2O + Heat \quad (3)$$

The chemical equilibrium and reaction dynamics are affected by at least temperature, pressure, pH, and molar ratios of reactants. In the reaction as provided in Equation (3), the enthalpy of reaction ($\Delta H_{Rx}$) is about −79.95 kcal mol$^{-1}$ (kilocalories per mole) with an irreversible equilibrium constant ($K_{eq}$)=3.9×1071 Pa×mol m$^{-3}$ (pascal-mole per cubic meter) at 25° C. The heat generated from this reaction may be absorbed by a solution to enhance a rate of another reaction. In one or more embodiments, the heat generated from Equation (3) increases a rate of release of $CO_2$ from the carbonated fluid.

The first salt solution and second salt solution may mix to form a thermogenic mixture in the formation. The thermogenic mixture may be maintained downhole in the formation, allowing the ammonium-based compound and the nitrite-based compound to react such that heat and nitrogen gas are generated from the thermogenic reaction under the conditions in the basaltic formation. The conditions may be selected from the group consisting of temperature, pH, and combinations thereof. In one or more embodiments, the conditions in the formation include a temperature of at least 60° C. or above such that a thermogenic reaction of the first salt solution and the second salt solution is triggered, thereby providing the thermogenic reaction. A temperature of the formation may be increased to provide the thermogenic reaction.

The conditions may include a pH less than or equal to about 4.0 in a formation in which the temperature is not equal to or greater than 60° C. However, if the pH is too acidic, the concentration of the ammonium containing compound may be unnecessarily diluted and the subsequent resulting nitrogen gas and heat generation may be unnecessarily decreased. Therefore, the conditions may have a sufficiently acidic pH for providing the thermogenic reaction and generation of heat and nitrogen while also preventing the dilution of the ammonium-based compound of the first salt solution.

As described above, the first salt solution may include an acid such that a pH of the thermogenic mixture is about 4.0 or below. The pH of about 4.0 or less of the thermogenic mixture may trigger the thermogenic reaction such that the pH of about 4.0 or less provides the thermogenic reaction. In one or more embodiments, the threshold pH of the treatment mixture is in a range with a lower limit from a pH of about 1.0, a pH of about 1.5, a pH of about 2.0, a pH of about 2.5, a pH of about 3.0, a pH of about 3.5, and a pH of about 4.0 to an upper limit of a pH of about 3.5, a pH of about 4.0, a pH of about 4.5, a pH of about 5.0, a pH of about 5.5, a pH of about 6.0, a pH of about 6.5, or a pH of about 7.0, where a value of the lower limit may be combined with a value of a mathematically compatible upper limit.

In one or more embodiments, the first salt solution and the second salt solution may mix to form an unreacted thermogenic mixture in the formation. An unreacted thermogenic mixture may form within a formation temperature below about 60° C. or less. In one or more embodiments, the thermogenic mixture with a pH above about 4.5 or more provided in a formation of about 60° C. or below is an unreacted thermogenic mixture. The conditions in the formation may include a pH of an unreacted thermogenic mixture of above about 4.0 before providing the carbonated fluid, wherein the carbonated fluid has a pH of about 4.0 or less, whereby the carbonated fluid triggers the thermogenic reaction.

In one or more embodiments, a mixture of the first salt solution, the second salt solution, the carbonated fluid, or combinations thereof provides a thermogenic reaction. In one or more embodiments, the unreacted thermogenic mixture reacts to provide a thermogenic reaction upon contact and/or mixing with the carbonated fluid. The carbonated fluid may be an acidic carbonated fluid as described above such that the acidic carbonated fluid triggers the unreacted thermogenic mixture to provide the thermogenic reaction.

In one or more embodiments, an acid in the form of carbonic acid present in the carbonated fluid is sufficient to trigger a reaction of Equation (3) as described above. As the acid may be in the form of carbonic acid from the carbonated fluid, the thermogenic reaction may occur immediately upon mixing of the unreacted thermogenic mixture and/or the carbonated fluid when the pH of the mixed fluid is less than or equal to about 4.0. Consequently, the introduction of the first salt solution and the second salt solution into a formation, followed by the carbonated fluid may trigger the thermogenic reaction between the first salt solution and the second salt solution, thereby providing the thermogenic reaction to generate heat and nitrogen gas.

Referring back to FIG. 1, carbon dioxide from the carbonated fluid is displaced in block 106. In one or more embodiments, heat produced from the thermogenic reaction increases a temperature of the carbonated fluid such that the solubility of $CO_2$ in the carbonated fluid is decreased. The heat produced from the thermogenic reaction may promote the release of $CO_2$ from the carbonated fluid. The heat produced from the thermogenic reaction may promote the release of $CO_2$ from the carbonated fluid via evaporation of $CO_2$, water, or both. The heat produced from the thermogenic reaction may promote the release of $CO_2$ from the carbonated fluid such that $CO_2$ is displaced.

In one or more embodiments, the amount of heat released from the thermogenic reaction, the amount of $CO_2$ released from the carbonated fluid, or both is predetermined prior to treatment of a subterranean formation. In such embodiments, the amount of heat generated from the thermogenic reaction is function of the concentration of the first salt solution and the second salt solution. In some embodiments, upscaled laboratory tests, simulation software, simulation tools, or combinations thereof are used to predetermine a target amount of $CO_2$ displaced from the carbonated fluid. In some embodiments, the target amount of the $CO_2$ released from the carbonated fluid is predetermined such that a majority of the $CO_2$ in the carbonated fluid is displaced.

The method 100 may further include block 108 in which the formation is swept with the displaced $CO_2$. Sweeping the formation with the displaced $CO_2$ may include a sweeping the formation in a uniform upward-directed flow path with the displaced carbon dioxide. The more uniform upward-directed flow path of the displaced $CO_2$ may be a flow path that has an origin point from a location in which the dense $CO_2$ carbonated fluid occupies, such as at the bottom of the formation. The flow path may include a vertical migration of the generated such that the generated $CO_2$ passes through one or more formation fluids, one or more rock layers, or both. The $CO_2$ undergoing a vertical migration may mix with one or more hydrocarbons present in one or more formation fluids, one or more rock layers, or both. The vertical migration of the displaced $CO_2$ may be a uniform upward-directed flow path through one or more vertical regions of the formation.

The one or more vertical regions of the formation may include a fluid containing portion of the formation, a rock containing portion of the formation, or combinations thereof. The vertical migration of the displaced $CO_2$ through one or more vertical regions may include passing the displaced $CO_2$ to one or more untreated vertical regions of the formation. The one or more untreated vertical regions may include hydrocarbons. The one or more untreated vertical regions may include a region that has not been treated with an oil recovery treatment, such as a primary oil recovery treatment, a secondary oil recovery treatment, or both.

Block 110 describes mixing the displaced carbon dioxide with at least a portion of the hydrocarbons in the vertical regions, thereby forming a mixture. In block 112, the mixture may be produced via a production well in the formation, thereby enhancing recovery of the hydrocarbons from the formation. The method may be performed after primary and secondary hydrocarbon recovery methods of a formation have been performed. In one or more embodiments, mixing the displaced carbon dioxide with the at least of portion of the hydrocarbons includes decreasing a viscosity of the one or more hydrocarbons, thereby forming a less viscous hydrocarbon mixture. The less viscous hydrocarbon mixture may be mobilized to a production well of the formation such that hydrocarbons are produced.

Figure 2:
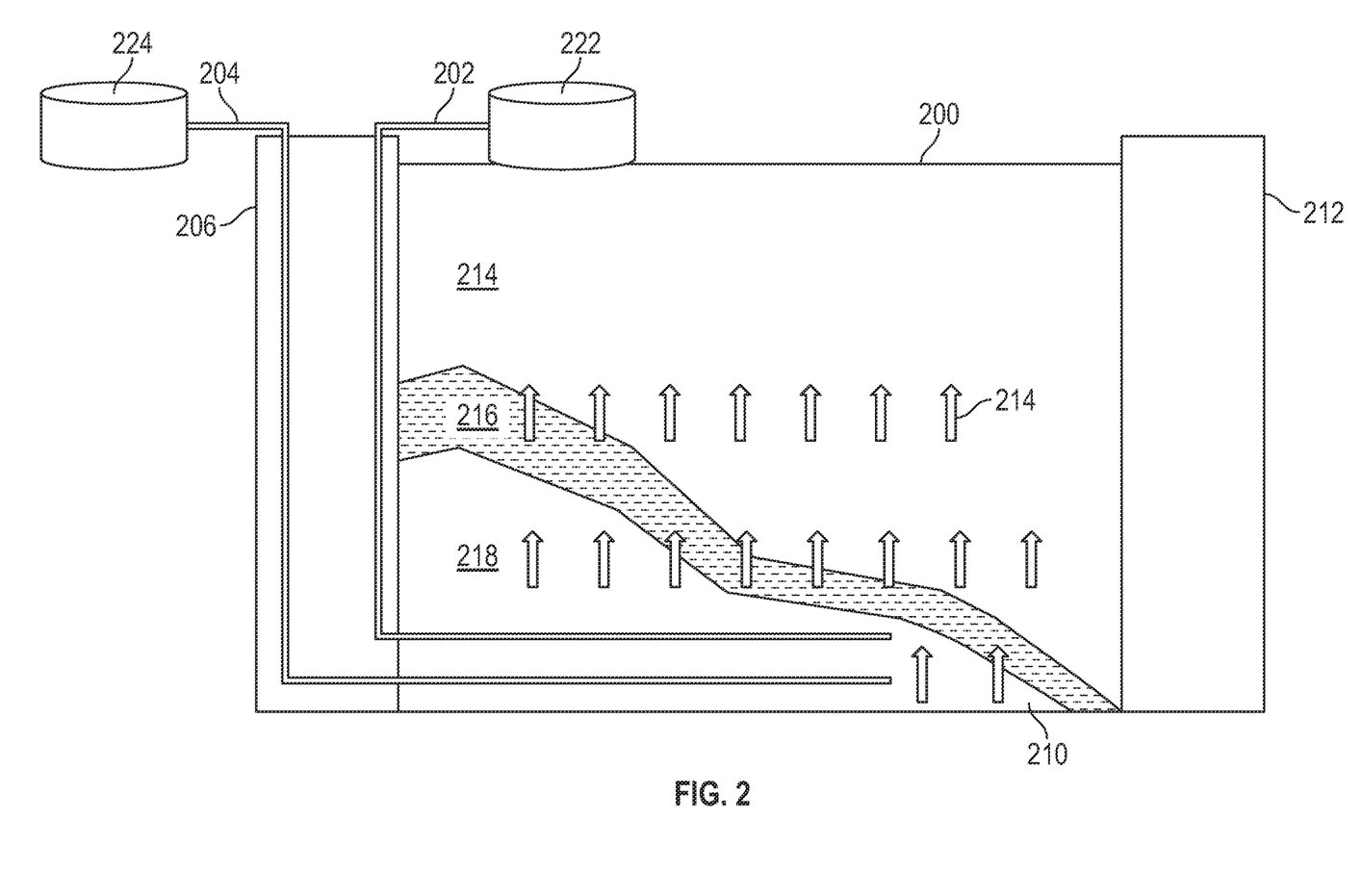
FIG. 2 is a schematic depicting enhanced hydrocarbon recovery treatments in accordance with one or more embodiments.

FIG. 2 shows a treatment of a formation according to one or more embodiments. A carbonated fluid 210 may be injected in a formation 200 via an injection well 206 such that the aqueous carbonated fluid 218 settles to the bottom of the formation 200 below a formation fluid 216. The formation fluid may be a water-based fluid used during primary recovery, secondary recovery, or combinations thereof. A first salt solution and a second salt solution may be injected from a first salt solution source 222 and a second salt solution source 224 via a first fluid transport line 202 and second fluid transport line 204. The first salt solution and the second salt solution may mix with the carbonated fluid to provide a thermogenic reaction. The thermogenic reaction may displace carbon dioxide from the carbonated fluid. The displaced $CO_2$ may migrate vertically to one or more regions of the formation as depicted by arrows 214. The displaced $CO_2$ may mix with one or more hydrocarbons of the one or more regions of the formation to form a mixture. The mixture may be produced to a surface location of the formation via a production well 212.

EXAMPLE

This example illustrates measurements of an exemplary reaction according to Equation (3). Sodium nitrite ($NaNO_2$) and ammonium chloride ($NH_4Cl$) were purchased from Fisher Scientific. Aqueous solutions of $NaNO_2$ and $NH_4Cl$ were independently prepared and added to a system that has temperature sensors to measure a change in temperature. Acetic acid was also added to the solution mixture to trigger a thermogenic reaction.

Figure 3:
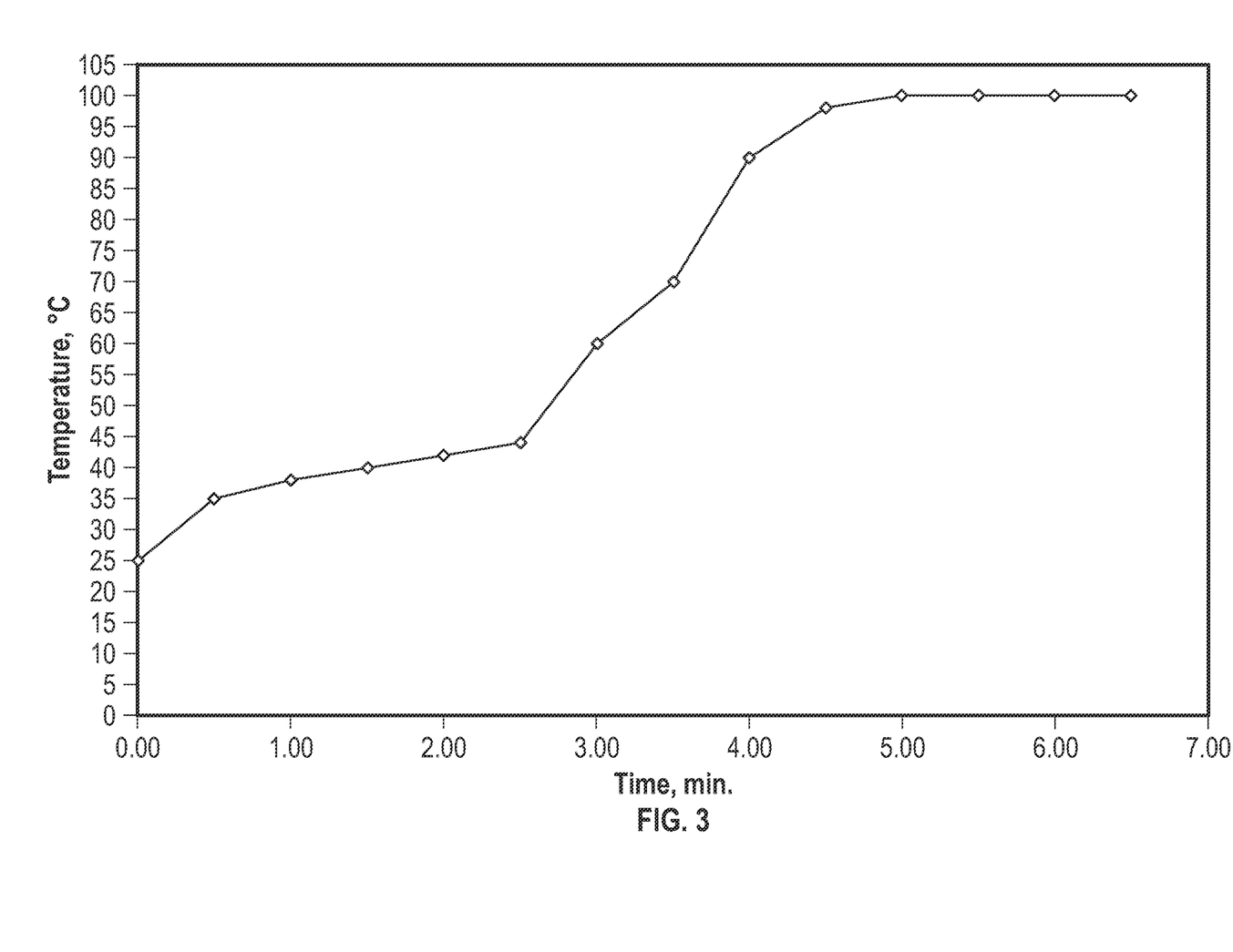
FIG. 3 is a graph of time versus temperature of a thermogenic reaction between a first thermogenic agent and a second thermogenic agent in accordance with one or more embodiments.

FIG. 3 is a graph of time versus temperature for a reaction with 64 mL (milliliters) of a 3 M (molar) $NaNO_2$ solution with 36 mL of a 3 M solution of $NH_4Cl$ solution triggered by 0.5 mL of acetic acid. As shown in FIG. 3, the heat generated from the reaction reached a maximum temperature of about 100° C. over time period of about five minutes.

Embodiments of the present disclosure may provide at least one of the following advantages. In one or more embodiments, the buoyancy of $CO_2$ that can be problematically associated with conventional $CO_2$ injection, such as with gravity override, is eliminated such that an aqueous carbonated fluid denser than a formation fluid is provided. The aqueous carbonated fluid may then be exposed to heat generated from a thermogenic reaction, generating buoyant $CO_2$ gas from the bottom of a formation and provide a more uniform upward-directed vertical flow path through the formation. The more uniform upward-directed flow path of the released $CO_2$ gas may provide an increased sweep efficiency to mobilize and produce hydrocarbons compared to conventional $CO_2$ flooding. The treatment methods and systems of one or more embodiments does not affect the formation rock and/or structural integrity of the subterranean formation to be treated.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range. While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

The invention claimed is:

1. A method of enhancing recovery of hydrocarbons from a formation, the method comprising:
   providing a carbonated fluid to the formation;
   introducing a first salt solution and a second salt solution to the formation comprising the carbonated fluid, wherein the first salt solution comprises an ammonium salt and the second salt solution comprises a salt selected from the group consisting of a nitrite salt, sodium hypochlorite, and combinations thereof;
   reacting the first salt solution with the second salt solution to provide heat, wherein the second salt solution is reactive with the first salt solution under conditions in the formation, wherein the conditions comprise a pH of above about 4.0 before providing the carbonated fluid, and wherein the carbonated fluid has a pH of about 4.0 or less, whereby the carbonated fluid triggers reacting the first salt solution with the second salt solution;
   displacing carbon dioxide from the carbonated fluid with the heat generated from reaction of the first salt solution with the second salt solution;
   sweeping the formation with the displaced carbon dioxide;
   mixing the displaced carbon dioxide with at least a portion of the hydrocarbons in one or more vertical regions of the formation, wherein the one or more vertical regions comprise a fluid containing portion, a rock containing portion, or combinations thereof, thereby forming a mixture; and
   producing the mixture via a production well in the formation, thereby enhancing recovery of the hydrocarbons from the formation.

2. The method of claim 1, wherein introducing the first salt solution and the second salt solution further comprises:
   injecting the first and second salt solution together into the formation.

3. The method of claim 1, wherein the conditions in the formation further comprise temperature.

4. The method of claim 3, wherein the conditions comprise a temperature of about 60° C. or above.

5. The method of claim 1, further comprising separately injecting the first salt solution and the second salt solution, wherein the second salt solution is capable of reaction with the first salt solution upon contact under injection conditions and under conditions in the formation.

6. The method of claim 1, further comprising forming the carbonated fluid via dissolving an amount of carbon dioxide in the form of carbonic acid in an aqueous solution.

7. The method of claim 6, wherein forming the carbonated fluid comprises forming the carbonated fluid having a density greater than an aqueous fluid of the formation.

8. The method of claim 1, further comprising forming the first salt solution via dissolving the ammonium salt in a first aqueous solution, wherein the ammonium salt is selected from the group consisting of ammonium chloride, ammonium bromide, ammonium nitrate, ammonium sulfate, ammonium carbonate, ammonium nitrite, ammonium hydroxide, and combinations thereof.

9. The method of claim 8, wherein the ammonium salt is ammonium chloride.

10. The method of claim 1, further comprising forming the second salt solution via dissolving the salt in a second aqueous solution, wherein the salt of the second salt solution is selected from the group consisting of sodium nitrite, potassium nitrite, sodium hypochlorite, and combinations thereof.

11. The method of claim 10, wherein the salt of the second salt solution comprises sodium nitrite.

12. The method of claim 1, wherein mixing the displaced carbon dioxide with the at least a portion of the hydrocarbons comprises decreasing a viscosity of the hydrocarbons, thereby forming a less viscous hydrocarbon mixture.

13. The method of claim 1, wherein prior to introducing the first salt solution and the second salt solution, the method further comprises:
   producing a fluid having an increased proportion of gas or water as compared to a fluid produced during a primary and/or secondary hydrocarbon recovery stage from a producing well of the formation.

14. The method of claim 1, further comprising:
   controlling an amount of the carbon dioxide displaced from the carbonated fluid by adjusting a concentration and/or molar ratio of the nitrite salt in the second salt solution to the ammonium salt of the first salt solution.

\* \* \* \* \*